United States Patent
Lu et al.

(10) Patent No.: US 11,500,074 B2
(45) Date of Patent: Nov. 15, 2022

(54) LIGHT DETECTION AND RANGING (LIDAR) WITH PULSE EQUALIZER

(71) Applicant: BEIJING VOYAGER TECHNOLOGY CO., LTD., Beijing (CN)

(72) Inventors: Yue Lu, Los Gatos, CA (US); Zhenghan Zhu, Mountain View, CA (US); Tao Chu, Mountain View, CA (US); John Wu, Mountain View, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 1006 days.

(21) Appl. No.: 16/221,424

(22) Filed: Dec. 14, 2018

(65) Prior Publication Data

US 2020/0191924 A1  Jun. 18, 2020

(51) Int. Cl.
*G01S 7/4863* (2020.01)

(52) U.S. Cl.
CPC .................. *G01S 7/4863* (2013.01)

(58) Field of Classification Search
CPC ...... G01S 7/486; G01S 7/4861; G01S 7/4865; G01S 7/4866; G01S 7/487; G01S 7/4876; G01S 7/493; G01S 7/495; G01S 7/48–51
See application file for complete search history.

(56) References Cited

U.S. PATENT DOCUMENTS

| | | |
|---|---|---|
| 6,914,553 B1 | 7/2005 | Beadle et al. |
| 9,716,529 B1 | 7/2017 | Dai et al. |
| 2011/0098970 A1 | 4/2011 | Hug et al. |
| 2013/0009711 A1 | 1/2013 | Liu et al. |
| 2019/0004158 A1 * | 1/2019 | Simard-Bilodeau .... G01S 17/04 |

FOREIGN PATENT DOCUMENTS

| | | | |
|---|---|---|---|
| CN | 103499819 A | 1/2014 | |
| CN | 108845306 A | 11/2018 | |
| EP | 2182378 A1 * | 5/2010 | ............. G01S 17/10 |
| EP | 3147690 A1 | 3/2017 | |

OTHER PUBLICATIONS

Boesch—Signal Preconditioning Using Feedforward Equalizers in ADC-Based Data Links—May 2016; Stanford University (Year: 2016).*
International Search Report issued in corresponding International Application No. PCT/US2018/067565, dated Apr. 25, 2019, 4 pages.
Written Opinion of the International Searching Authority issued in corresponding International Application No. PCT/US2018/067565, dated Apr. 25, 2019, 5 pages.

* cited by examiner

*Primary Examiner* — Luke D Ratcliffe
(74) *Attorney, Agent, or Firm* — Bayes PLLC

(57) ABSTRACT

Embodiments of the disclosure provide receivers for a light detection and ranging (LiDAR) scanner. The receiver includes a photodetector configured to receive a laser beam, and convert the received laser beam to an electrical signal including a plurality of pulses. The receiver also includes an amplifier configured to amplify the electrical signal. The receiver further includes a pulse equalizer configured to sharpen the plurality of pulses in the amplified electrical signal. Each pulse is sharpened to have a narrower width and an increased amplitude.

17 Claims, 5 Drawing Sheets

LIGHT DETECTION AND RANGING (LIDAR) WITH PULSE EQUALIZER

TECHNICAL FIELD

The present disclosure relates to a Light Detection and Ranging (LiDAR) system, and more particularly to, a LiDAR receiver having a pulse equalizer.

BACKGROUND

LiDAR systems have been widely used in autonomous driving and producing high-definition maps. For example, LiDAR systems measure distance to a target by illuminating the target with pulsed laser light and measuring the reflected pulses with a sensor. Differences in laser return times and wavelengths can then be used to make digital three-dimensional (3-D) representations of the target. The laser light used for LiDAR scan may be ultraviolet, visible, or near infrared. Because using a narrow laser beam as the incident light from the scanner can map physical features with very high resolution, a LiDAR system is particularly suitable for applications such as high-definition map surveys.

Range estimation accuracy is a key measure of a LiDAR system's performance. Typically, range estimation accuracy is defined as the standard deviation of range estimation error that the LiDAR system produces. The smaller the standard deviation is, the better the LiDAR system's performance is. The range estimation accuracy depends on the shape of the returned signal. In general, the wider the signal is, the worse the range estimation accuracy.

A LiDAR typically includes a transmitter to transmit laser beams to an object. The laser beam is backscattered and returned by the object, and the returned laser beam is received by a LiDAR receiver. The LiDAR receiver typically includes components such as a photodetector and an amplifier. These components usually distort the returned laser beam, e.g., by widening the pulses in the returned laser beam. Accordingly, range estimation errors increase and range estimation accuracy decreases.

Embodiments of the disclosure address the above problems by an improved LiDAR receiver having a pulse equalizer.

SUMMARY

Embodiments of the disclosure provide a receiver for a LiDAR system. The receiver includes a photodetector configured to receive a laser beam, and convert the received laser beam to an electrical signal including a plurality of pulses. The receiver also includes an amplifier configured to amplify the electrical signal. The receiver further includes a pulse equalizer configured to sharpen the plurality of pulses in the amplified electrical signal. Each pulse is sharpened to have a narrower width and an increased amplitude.

Embodiments of the disclosure also provide a LiDAR system. The LiDAR system includes a transmitter and a receiver. The transmitter is configured to transmit a native laser beam to scan an object. The receiver includes a photodetector configured to receive a laser beam returned from the object, and convert the received laser beam to an electrical signal including a plurality of pulses. The receiver also includes an amplifier configured to amplify the electrical signal. The receiver further includes a pulse equalizer configured to sharpen the plurality of pulses in the amplified electrical signal. Each pulse is sharpened to have a narrower width and an increased amplitude.

Embodiments of the disclosure also provide another receiver for a LiDAR system. The receiver includes a photodetector configured to receive a laser beam, and convert the received laser beam to an electrical signal including a plurality of pulses. The receiver further includes an amplifier configured to amplify the electrical signal. The receiver also includes an analog to digital converter configured to convert the amplified electrical signal to a digital signal including a plurality of digitized pulses. The receiver additionally includes a feed-forward equalizer configured to sharpen the plurality of digitized pulses in the amplified electrical signal. The feed-forward equalizer is characterized by a plurality of filter coefficients.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
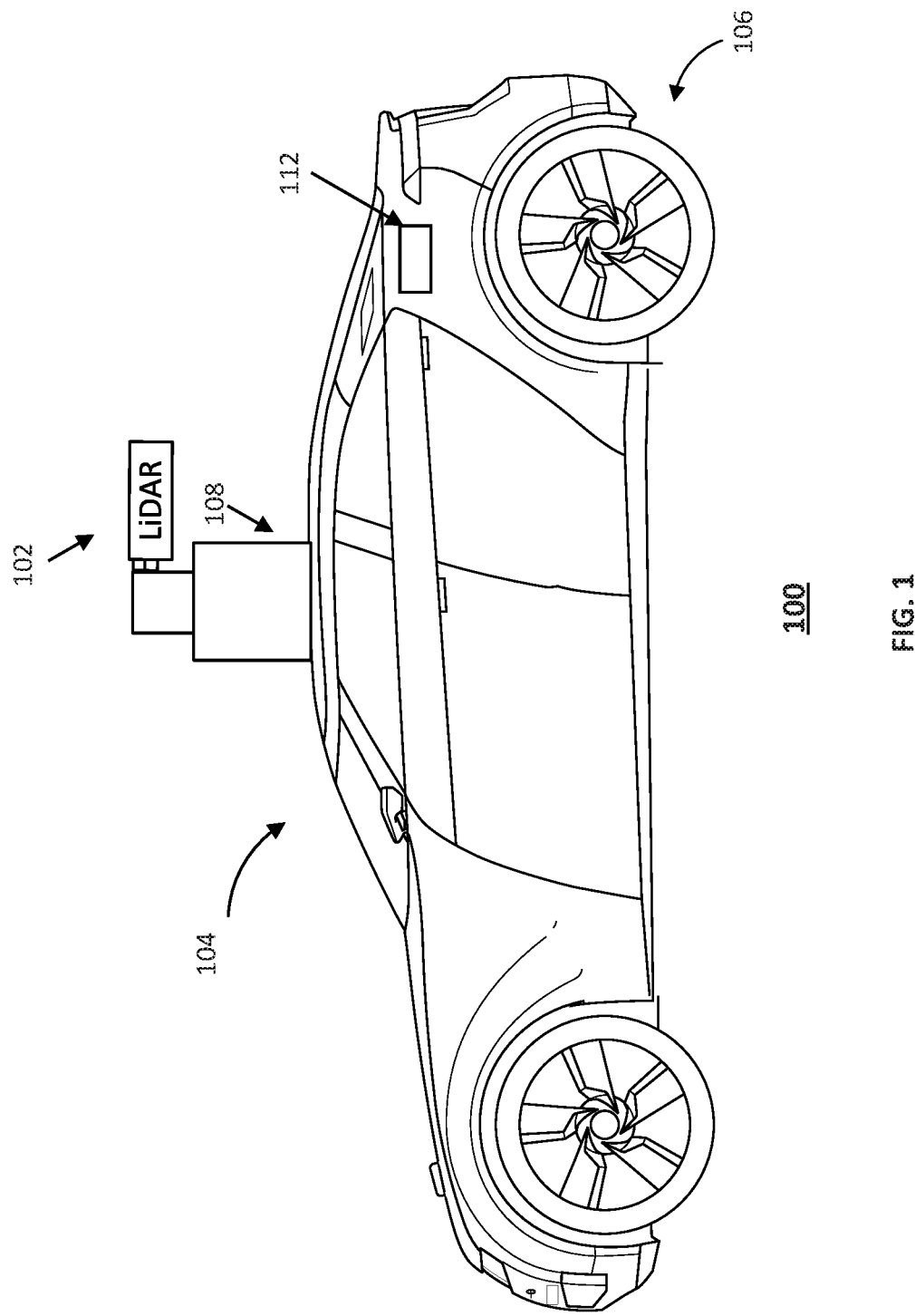
FIG. 1 illustrates a schematic diagram of an exemplary vehicle equipped with a LiDAR system, according to embodiments of the disclosure.

FIG. 1 illustrates a schematic diagram of an exemplary vehicle 100 equipped with a LiDAR system 102, according to embodiments of the disclosure. Consistent with some embodiments, vehicle 100 may be a survey vehicle configured for acquiring data for constructing a high-definition map or 3-D buildings and city modeling. It is contemplated that vehicle 100 may be an electric vehicle, a fuel cell vehicle, a hybrid vehicle, or a conventional internal combustion engine vehicle. Vehicle 100 may have a body 104 and at least one wheel 106. Body 104 may be any body style, such as a sports vehicle, a coupe, a sedan, a pick-up truck, a station wagon, a sports utility vehicle (SUV), a minivan, or a conversion van. In some embodiments of the present disclosure, vehicle 100 may include a pair of front wheels and a pair of rear wheels, as illustrated in FIG. 1. However, it is contemplated that vehicle 100 may have less wheels or equivalent structures that enable vehicle 100 to move around. Vehicle 100 may be configured to be all wheel drive (AWD), front wheel drive (FWR), or rear wheel drive (RWD). In some embodiments of the present disclosure, vehicle 100 may be configured to be operated by an operator occupying the vehicle, remotely controlled, and/or autonomous.

As illustrated in FIG. 1, vehicle 100 may be equipped with LiDAR system 102 mounted to body 104 via a mounting structure 108. Mounting structure 108 may be an electro-mechanical device installed or otherwise attached to body 104 of vehicle 100. In some embodiments of the present disclosure, mounting structure 108 may use screws, adhesives, or another mounting mechanism. It is contemplated that the manners in which LiDAR system 102 can be equipped on vehicle 100 are not limited by the example shown in FIG. 1 and may be modified depending on the types of LiDAR system 102 and/or vehicle 100 to achieve desirable 3-D sensing performance.

Consistent with some embodiments, LiDAR system 102 may be configured to capture data as vehicle 100 moves along a trajectory. For example, a transmitter of LiDAR system 102 is configured to scan the surrounding and acquire point clouds. LiDAR system 102 measures distance to a target by illuminating the target with pulsed laser light and measuring the reflected pulses with a receiver. The laser light used for LiDAR system 102 may be ultraviolet, visible, or near infrared. In some embodiments of the present disclosure, LiDAR system 102 may capture point clouds. As vehicle 100 moves along the trajectory, LiDAR system 102 may continuously capture data. Each set of scene data captured at a certain time range is known as a data frame.

Consistent with the present disclosure, vehicle 100 may include a local controller 112 inside body 104 of vehicle 100 or communicate with a remote computing device, such as a server, (not illustrated in FIG. 1) for controlling the operations of LiDAR system 102. In some embodiments of the present disclosure, controller 112 may have different modules in a single device, such as an integrated circuit (IC) chip (implemented as an application-specific integrated circuit (ASIC) or a field-programmable gate array (FPGA)), or separate devices with dedicated functions. In some embodiments of the present disclosure, one or more components of controller 112 may be located inside vehicle 100 or may be alternatively in a mobile device, in the cloud, or another remote location. Components of controller 112 may be in an integrated device or distributed at different locations but communicate with each other through a network (not shown).

Figure 2:
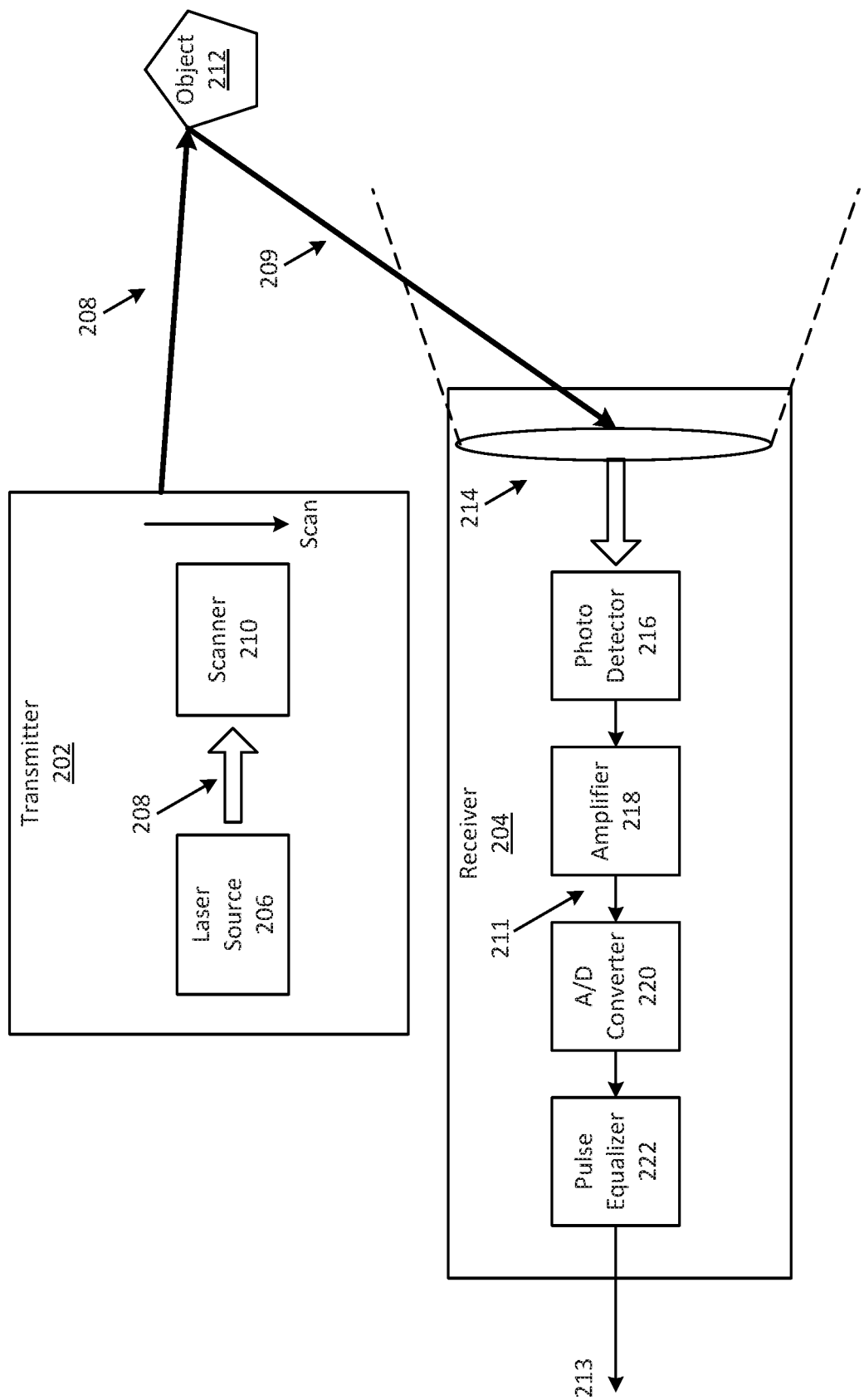
FIG. 2 illustrates a block diagram of an exemplary LiDAR system having a receiver with a pulse equalizer, according to embodiments of the disclosure.

FIG. 2 illustrates a block diagram of an exemplary LiDAR system 102, according to embodiments of the disclosure. LiDAR system 102 may include a transmitter 202 and a receiver 204. Transmitter 202 may emit laser beams within a scan angle. Transmitter 202 may include a laser source 206 and a scanner 210. In some embodiments, laser source 206 may generate a pulsed laser beam 208 (also referred to as a native laser beam 208) in the ultraviolet, visible, or near infrared wavelength range.

In some embodiments, laser sources 206 may be a PLD. A PLD may be a semiconductor device similar to a light-emitting diode (LED) in which the laser beam is created at the diode's junction. In some embodiments of the present disclosure, a PLD includes a PIN diode in which the active region is in the intrinsic (I) region, and the carriers (electrons and holes) are pumped into the active region from the N and P regions, respectively. Depending on the semiconductor materials, the wavelength of native laser beam 208 provided by a PLD may be smaller than 1,100 nm, such as 405 nm, between 445 nm and 465 nm, between 510 nm and 525 nm, 532 nm, 635 nm, between 650 nm and 660 nm, 670 nm, 760 nm, 785 nm, 808 nm, or 848 nm. Native laser beam 208 includes a plurality of pulses. In some embodiments, the pulses in native laser beam 208 typically has a narrow width in order to map physical features with very high resolution.

In some embodiments, scanner 210 may be configured to emit laser beam 208 to an object 212 in one or more directions to scan object 212. Object 212 may be made of a wide range of materials including, for example, non-metallic objects, rocks, rain, chemical compounds, aerosols, clouds and even single molecules. The wavelength of native laser beam 208 may vary based on the composition of object 212. At each time point during the scan, scanner 210 may emit native laser beam 208 to object 212 in a direction within the scan angle. In some embodiments of the present disclosure, scanner 210 may also include optical components (e.g., lenses, mirrors) that can focus pulsed laser light into a narrow laser beam to increase the scan resolution and range of object 212.

As part of LiDAR system 102, receiver 204 may be configured to detect a returned laser beam 209 returned from object 212 in a different direction. Receiver 204 can collect laser beams returned from object 212 and output electrical signal reflecting the intensity of the returned laser beams. Upon contact, laser light can be reflected by object 212 via backscattering, such as Rayleigh scattering, Mie scattering, Raman scattering, and fluorescence. Returned laser beam 209 also includes a plurality of pulses.

As illustrated in FIG. 2, receiver 204 may include a lens 214, a photodetector 216, an amplifier 218, an analog to digital converter (ADC) 220, and a pulse equalizer 222. In some embodiments, lens 214 may be configured to collect light from a respective direction in its field of view (FOV). At each time point during the scan, returned laser beam 209 may be collected by lens 214. Returned laser beam 209 may be returned from object 212 and have the same wavelength as combined laser beam 209.

Photodetector 216 may be configured to detect returned laser beam 209 returned from object 212. Photodetector 216 may convert the laser light (e.g., returned laser beam 209) collected by lens 214 into an electrical signal (e.g., a current or a voltage signal). The current is generated when photons are absorbed in the photodiode. In some embodiments, photodetector 216 may include silicon PIN photodiodes that utilize the photovoltaic effect to convert optical power into an electric current. For example, photodetector 216 may include an array of avalanche photodiodes (ADPs).

An APD is a highly sensitive semiconductor electronic device that exploits the photoelectric effect to convert light to electricity. In some embodiments. APDs provide a built-in first stage of gain through avalanche multiplication. In some embodiments, by applying a high reverse bias voltage (typically 100-200 V in silicon). APDs may show an internal current gain effect (around 100) due to impact ionization (also known as an avalanche effect). In some other embodiments. APDs may employ alternative doping and beveling techniques, and allow greater voltage to be applied (>1500 V) before breakdown is reached, which results in a greater operating gain (>1000). APDs are therefore ideal for laser-based distance measurement, laser scanning and mapping, shape recognition and remote sensing, as well as LIDAR.

Amplifier 218 may be configured to amply the electrical signal generated by photodetector 216. Amplification may increase the amplitude of the pulses in the electrical signal. In LiDAR applications, a low-noise amplifier is used to optimize the range of the system because the amplitude of the return signals decreases proportionally to the square of the distance. In some embodiments, amplifier 218 may be a very-low-noise transimpedance amplifier (TIA). A TIA is a current to voltage converter, and may be used with sensors that have a current response that is more linear than the voltage response, such as photodiodes. For example, amplifier 218 may include a TIA to amplify the current output of photodetector 216 to a usable voltage. The frequency response of a TIA is inversely proportional to the gain, which is set by the feedback resistor. The sensor that the TIA is used with (such as a photodetector) can be modeled as a current source and a capacitor C. This capacitance across the input terminals of the op-amp in the TIA introduces a low-pass filter in the feedback path. Therefore, the photo detection and amplification, e.g., performed by an ADP and a TIA, may act as a low-pass filter and distort the pulses in returned laser beam 209.

The electrical signal generated by photodetector 216 and amplified by amplifier 218 remain in the analog form. To facilitate subsequent signal processor in digital form, receiver 204 may include an ADC 220 to convert the analog signal to a digital signal. For example, the pulses in the analog signal may be digitized. In some embodiments, ADC 220 may be replaced by a time to digital converter (TDC). TDC is a device for recognizing events and providing a digital representation of the time they occurred. For example, a TDC might output the time of arrival for each incoming pulse.

Figure 3:
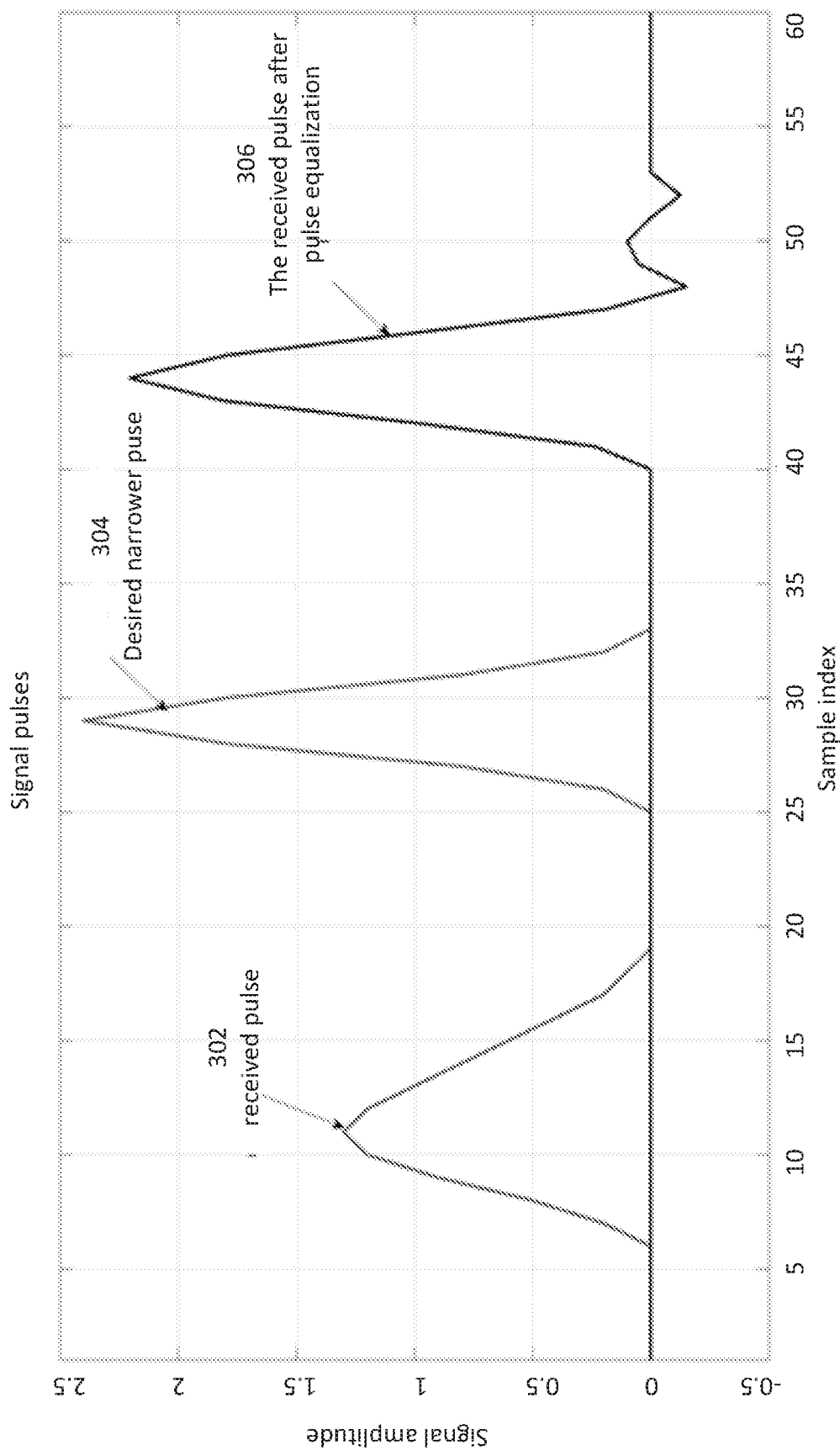
FIG. 3 illustrates exemplary pulses in a LiDAR laser beam, according to embodiments of the disclosure.

Photodetectors and amplifiers typically distort pulsed signals. For example, photodetector 216 and amplifier 218 may act as low-pass filters and widen the width of pulsed within returned laser beam 209. As the pulse width increases, the pulse amplitude (i.e., peak signal value of the pulse) decreases, and the pulse is flattened. For example, FIG. 3 illustrates exemplary pulses in a LiDAR laser beam, according to embodiments of the disclosure. FIG. 3 shows a pulse 302, which is a narrow width pulse in native laser beam 208 or returned laser beam 209. Pulse 302 is detected by photodetector 216 and amplified by amplifier 218, and becomes received pulse 304. Compared to pulse 302, pulse 304 is broadened in width and flattened in amplitude.

In addition to widening, while native laser beam 208 and returned laser beam 209 may contain pulses that are symmetrical, photodetector 216 and amplifier 218 may cause pulses to become non-symmetrical. For example, as shown in FIG. 3, pulse 302 is symmetrical but distorted pulse 304 becomes non-symmetrical.

In some embodiments consistent with the present disclosure, receiver 204 may include pulse equalizer 222 to correct or mitigate the signal distortion caused by photodetector 216 and amplifier 218 and recover the native pulses. In some embodiments, pulse equalizer 222 may sharpen the distorted laser beam. For example, pulse equalizer may be configured to narrow the distorted pulse and increase its amplitude. As shown in FIG. 3, pulse equalizer 222 may be applied to pulse 304 and obtain sharpened pulse 306. Compared to pulse 304, sharpened pulse 306 is narrowed in width and increased in amplitude. As further shown in FIG. 3, sharpened pulse 306 better resembles pulse 302, which is in the desired shape to yield a better range estimation accuracy.

In some embodiments, pulse equalizer 222 may be implemented in an analog form or in a digital form. For example, FIG. 2 shows that pulse equalizer 222 is connected after ADC 220, and thus pulse equalizer 222 is implemented as a digital equalizer to sharpen digitized pulses that are obtained by A/D conversion of ADC 220. In some alternative embodiments, pulse equalizer 222 may be implemented as an analog equalizer and connected between amplifier 218 and ADC 220. In other words, pulse equalization may be performed before or after A/D conversion. In the embodiments where A/D conversion is performed after pulse equalization, ADC 220 may convert the sharpened pulses to digitized pulses.

Figure 4:
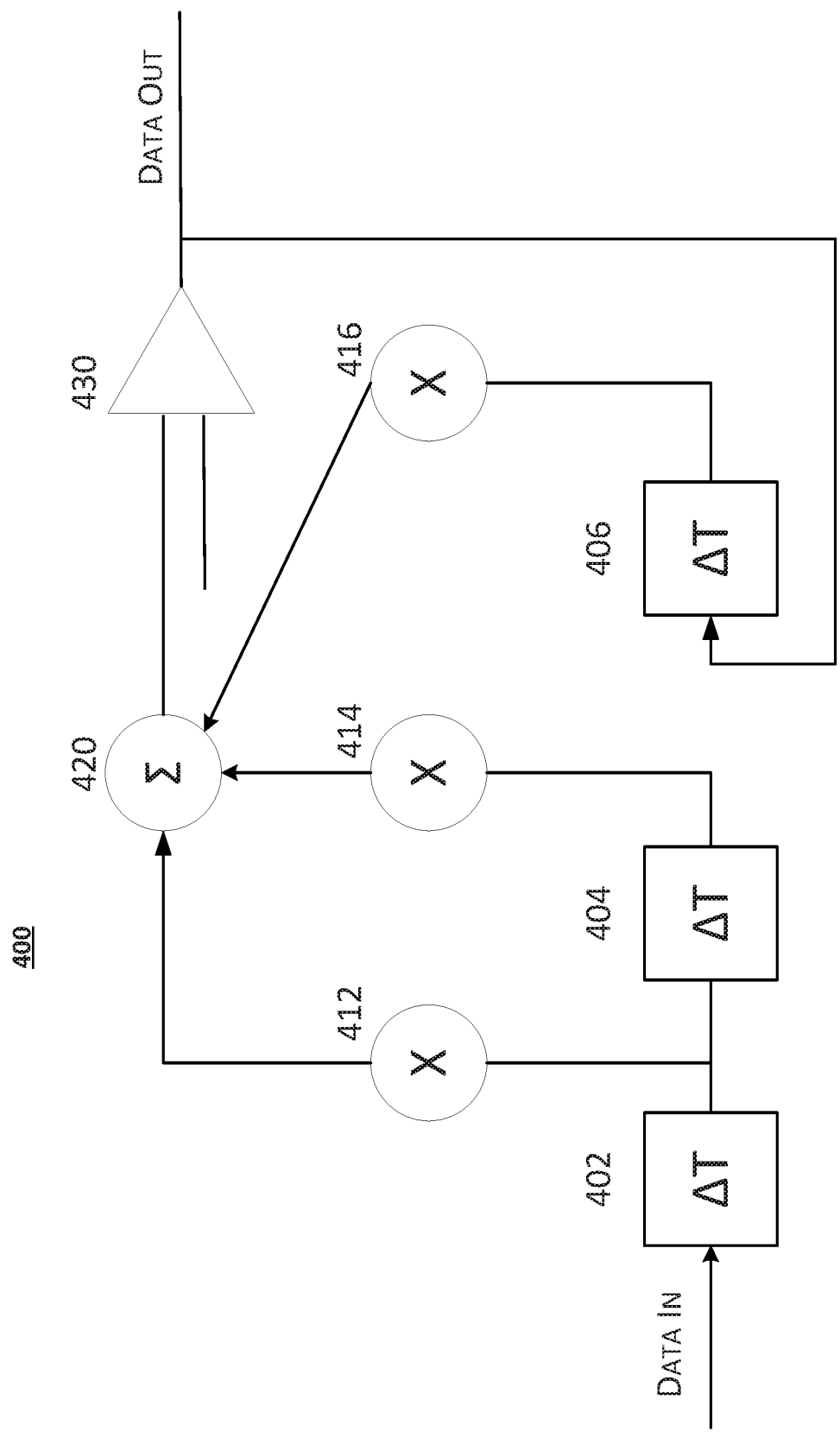
FIG. 4 illustrates an exemplary feed-forward equalizer, according to embodiments of the disclosure.

In some embodiments, pulse equalizer 222 may be implemented as a feed-forward equalizer. A feed-forward equalizer is a linear filter that has a finite impulse response (FIR). Accordingly, pulse equalizer 222 may be configured to equalize a channel's response in all frequencies in the band of interest. In such a way, pulse equalizer can "reverse" the distortion caused by the channel (e.g. APD, TIA and other amplifiers). A feed-forward equalizer may also be implemented in an analog form or in a digital form. For example, FIG. 4 illustrates an exemplary feed-forward equalizer 400, according to embodiments of the disclosure. Feed-forward equalizer 400 can be designed in the digital domain or entirely in the analog domain.

Feed-forward equalizer 400 may include a series of tap weights programmed to adjust the impulse and frequency responses. As shown in FIG. 4, feed-forward equalizer 400 may include delay modules 402-406 (also known as "taps"), multiplexers 412-416, a summation module 420, and a comparator 430. It is contemplated that a feed-forward equalizer may be configured differently and/or include different components as shown in FIG. 4. Input data, such as a pulsed signal, may be fed to a delay module 402 for a first delay. The first delayed data is further provided to a delay module 404 for a second delay. The first delayed data and second delayed data may be supplied to their respective multiplexers 412 and 414 for multiplexing. The multiplexed signals are then added up by summation module 420. The summed data is supplied to comparator 430, where it is compared with a preset signal, such as a signal that specifies the slice level. Comparator 430 calculates a difference between the two input signals. In some embodiments, the output data is routed to delay module 406 for a third delay. The third delayed data is further multiplexed by multiplexer 416, and then feed to summation module 420. As such, the output data is "feed-forward" to the equalizer, to further adjust the output data.

Figure 5:
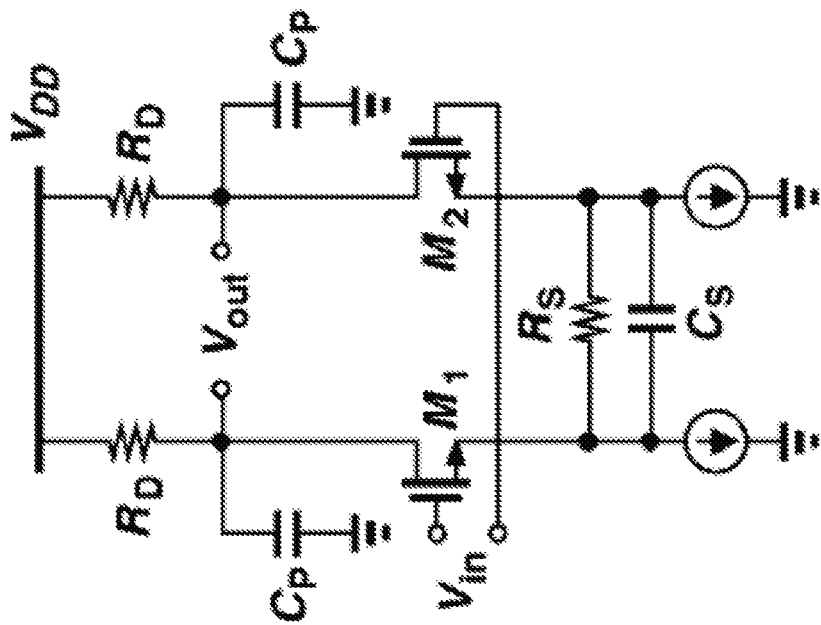
FIG. 5 illustrates exemplary continuous-time linear equalizers, according to embodiments of the disclosure.
Figure 5:
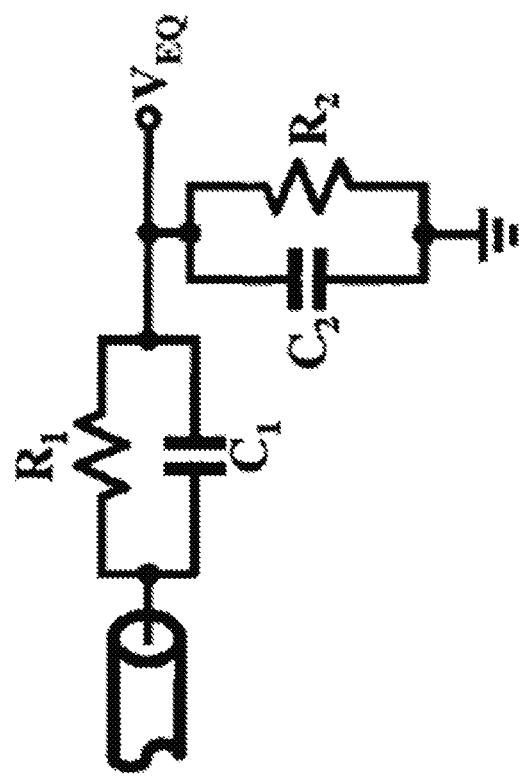

In some embodiments, pulse equalizer 222 may be implemented as a deconvolution equalizer, such as a Wiener filter and a continuous-time linear equalizer (CTLE) or CTLE is typically an analog filter, and thus may be connected before ADC 220. CTLE is a linear filter that attenuates low-frequency signal components, amplifies components around the Nyquist frequency, and filters off higher frequencies. CTLE gain can be adjusted to optimize the ratio of low frequency attenuation to high frequency amplification. Therefore, CTLE may address the channel's low pass nature. For example, FIG. 5 illustrates exemplary CTLEs, including a passive CTLE 510 and an active CTLE 520, according to embodiments of the disclosure.

A CTLE can be purely passive (such as passive CTLE 510) or combined with an amplifier to provide gains (such as active CTLE 520). Passive CTLE 510 may be implemented with R-C or R-L circuits (e.g., including $R_1$-$C_1$ and $R_2$-$C_2$ pairs connected as shown in FIG. 5). The gains of passive CTLE 510 may be calculated as:

DC gain=$R_2/(R_1+R_2)$

HF gain=$C_1/(C_1+C_2)$

Accordingly, its peaking may occur at

HF gain/DC gain=$(R_1+R_2)C_1/(C_1+C_2)R_2$

Passive CTLE 510 may offer great linearity, but no gain at Nyquist frequency. In comparison, active CTLE 520 may include an input amplifier with RC degeneration. Therefore, active CTLE 520 allows frequency peaking with gain at Nyquist frequency. The gains of active CTLE 520 may be calculated as:

DC gain=$g_m R_D/(1+g_m R_s/2)$

HF gain=$g_m R_D$

Accordingly, the ideal peaking occurs at

HF gain/DC gain=$1+g_m R_s/2$ where in the above formulas, $g_m$ is a transconductance.

Referring back to FIG. 2, in some embodiments, pulse equalizer 222 may be characterized by multiple filter coefficients. The filter coefficients may be different based on the type of configuration of pulse equalizer 222. For example, feed-forward equalizer 400 is characterized by coefficients including the delays ΔT of delay modules 402-406, the multiplexing parameters of multiplexers 412-416, the reference signal of comparator 430, etc. As another example, passive CTLE 510 is characterized by the resister values $R_1$ and $R_2$, and capacitor values $C_1$ and $C_2$. The resistor and capacitor values can be adjusted (known as "tuned") to set the gains and peaking of CTLE 510.

The performance of pulse equalizer 222 may be determined by the filter coefficients. In some embodiments, the filter coefficients may be optimized in order to achieve best equalization performance either in the time domain or the frequency domain.

Various cost functions may be used for the optimization. For example, one goal of equalization is to "recover" the pulse shape of the native laser beam. Therefore, a cost function may be constructed to minimize a difference between the "recovered" pulse and the pulse in the native laser beam. For example, a time domain cost function may be the mean square error between the desired pulse and the pulse after equalization. That is, the cost function can be written as $\|y-Hx\|^2$, where the desired pulse is denoted by y, the original distorted pulse is denoted by x, and the filter operation is denoted by H. As another example, since the signal distortion is caused by the frequency response of photodetector 216 and amplifier 218, the cost function may be constructed to minimize the overall frequency responses of these components. For example, a frequency domain cost function is the level of frequency response equalization. The coefficients can be optimized by minimizing the overall frequency response of "channel+equalizer" fluctuations over all frequencies of interest.

In some embodiments, any suitable method can be used to solve the optimization problem. For example, any method that leads to convergence can be used. The disclosed equalizer coefficients optimization problem often has closed form solutions. When closed form does not exist, any iterative method can be employed.

After equalization, pulse equalizer 222 may provide a recovered signal 213 to additional signal processor components (not shown) within LiDAR system 102 for further processing. Because recovered signal 213 includes the sharpened pulses, it helps improve the range estimation accuracy of LiDAR system 102.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A receiver for a light detection and ranging (LiDAR) system, comprising:
    a photodetector configured to receive a laser beam, and convert the laser beam into an electrical signal including a plurality of pulses;
    an amplifier configured to amplify the electrical signal; and
    a pulse equalizer configured to sharpen the plurality of pulses in the amplified electrical signal, wherein each pulse is sharpened to have a narrower width and an increased amplitude,
        wherein the pulse equalizer is characterized by a plurality of filter coefficients, and wherein the plurality of filter coefficients are predetermined through optimization using a cost function,
        wherein the optimization minimizes a frequency response of the photodetector and the amplifier in a frequency domain, wherein the cost function is constructed to minimize an overall frequency response of channel plus equalizer fluctuations over a set of frequencies of interest.

2. The receiver of claim 1, further including an analog to digital converter configured to convert the amplified electrical signal to a digital signal including a plurality of digitized pulses, wherein the pulse equalizer is a digital equalizer coupled to the analog to digital converter and configured to sharpen the digitized pulses.

3. The receiver of claim 1, wherein the pulse equalizer is an analog equalizer, and the receiver further comprises an analog to digital converter configured to convert the electrical signal including the sharpened pulses to a digital signal including a plurality of digitized pulses.

4. The receiver of claim 1, wherein the pulse equalizer is a feed-forward equalizer.

5. The receiver of claim 1, wherein the pulse equalizer is a Wiener filter or a continuous-time linear equalizer.

6. The receiver of claim 1, wherein the channel includes an avalanche photodiode (APD), a transimpedance amplifier (TIA), and at least one other amplifier.

7. The receiver of claim 1, wherein the optimization minimizes a difference between the sharpened pulses and respective desired pulses in a time domain.

8. The receiver of claim 7, wherein the cost function is constructed to minimize a mean square error between each desired pulse and the corresponding sharpened pulse.

9. A light detection and ranging (LiDAR) system, comprising:
    a transmitter configured to transmit a native laser beam to scan an object; and
    a receiver, comprising:
        a photodetector configured to receive a laser beam returned from the object, and convert the received laser beam to an electrical signal including a plurality of pulses;
        an amplifier configured to amplify the electrical signal; and
        a pulse equalizer configured to sharpen the plurality of pulses in the amplified electrical signal, wherein each pulse is sharpened to have a narrower width and an increased amplitude,
            wherein the pulse equalizer is characterized by a plurality of filter coefficients, and wherein the plurality of filter coefficients are predetermined through optimization using a cost function,
            wherein the optimization minimizes a frequency response of the photodetector and the amplifier in a frequency domain, wherein the cost function is constructed to minimize an overall frequency response of channel plus equalizer fluctuations over a set of frequencies of interest.

10. The LiDAR system of claim 9, wherein the receiver further comprises an analog to digital converter configured to convert the amplified electrical signal to a digital signal including a plurality of digitized pulses, wherein the pulse equalizer is a digital equalizer coupled to the analog to digital converter and configured to sharpen the digitized pulses.

11. The LiDAR system of claim 9, wherein the pulse equalizer is an analog equalizer, and the receiver further comprises an analog to digital converter configured to convert the electrical signal including the sharpened pulses to a digital signal including a plurality of digitized pulses.

12. The LiDAR system of claim 9, wherein the pulse equalizer is a feed-forward equalizer.

13. The LiDAR system of claim 9, wherein the pulse equalizer is a Wiener filter or a continuous-time linear equalizer.

14. The LiDAR system of claim 9, wherein the optimization minimizes a difference between the sharpened pulses and respective pulses in the native laser beam in a time domain.

15. A receiver for light detection and ranging (LiDAR) system, comprising:
   a photodetector configured to receive a laser beam, and convert the received laser beam to an electrical signal including a plurality of pulses;
   an amplifier configured to amplify the electrical signal;
   an analog to digital converter configured to convert the amplified electrical signal to a digital signal including a plurality of digitized pulses; and
   a feed-forward equalizer configured to sharpen the plurality of digitized pulses in the amplified electrical signal, wherein the feed-forward equalizer is characterized by a plurality of filter coefficients optimized using a cost function,
   wherein the plurality of filter coefficients are optimized to minimize a frequency response of the photodetector and the amplifier in a frequency domain, wherein the cost function is constructed to minimize an overall frequency response of channel plus equalizer fluctuations over a set of frequencies of interest.

16. The receiver of claim 15, wherein each sharpened pulse has a narrower width and an increased amplitude compared to the respective digitized pulse.

17. The receiver of claim 15, wherein the photodetector is an array of avalanche photodiodes and the amplifier is a transimpedance amplifier.

* * * * *